United States Patent
Noguchi et al.

(10) Patent No.: US 10,137,665 B2
(45) Date of Patent: Nov. 27, 2018

(54) METHOD FOR MANUFACTURING LAMINATE, AND LAMINATE

(71) Applicant: TOKYO OHKA KOGYO CO., LTD., Kawasaki-shi (JP)

(72) Inventors: Takuya Noguchi, Kawasaki (JP); Takahiro Senzaki, Kawasaki (JP); Toshiyuki Ogata, Kawasaki (JP)

(73) Assignee: TOKYO OHKA KOGYO CO., LTD., Kawasaki-Shi (JP)

( * ) Notice: Subject to any disclaimer, the term of this patent is extended or adjusted under 35 U.S.C. 154(b) by 82 days.

(21) Appl. No.: 15/394,211

(22) Filed: Dec. 29, 2016

(65) Prior Publication Data

US 2017/0203559 A1 Jul. 20, 2017

(30) Foreign Application Priority Data

Jan. 14, 2016 (JP) .................. 2016-005635
Jan. 14, 2016 (JP) .................. 2016-005636

(Continued)

(51) Int. Cl.
  *B01D 53/22* (2006.01)
  *B32B 7/12* (2006.01)
  (Continued)

(52) U.S. Cl.
  CPC .............. *B32B 7/12* (2013.01); *B01D 69/02* (2013.01); *B01D 69/10* (2013.01); *B01D 69/12* (2013.01);
  (Continued)

(58) Field of Classification Search
  CPC ...... B01D 46/543; B01D 53/22; B32B 38/10; B32B 37/182; B32B 2305/026;
  (Continued)

(56) References Cited

U.S. PATENT DOCUMENTS 8,999,167 B2    4/2015 Nakano et al.
2002/0139245 A1*  10/2002 Kesten .................. B01D 53/22
                                                  95/52

(Continued)

FOREIGN PATENT DOCUMENTS

EP    1666129 A1    6/2006
EP    2977099 A1    1/2016

(Continued)

OTHER PUBLICATIONS

Pai et al. "Photoresist with low fluorescence for bioanalytical applications." Anal. Chem. 2007, 79, 8774-8780. (Year: 2007).

(Continued)

*Primary Examiner* — Anthony R Shumate
(74) *Attorney, Agent, or Firm* — Knobbe Martens Olson & Bear LLP

(57) ABSTRACT

After bringing a water-containing peeling liquid in contact with a thin flat film formed on a substrate, a support film including a cover film having one main surface thereof is laminated onto the flat film, such that the support film is in contact with the flat film, a cover film-attached laminate composed of a support film and a cover film is then separated from the substrate, and the laminate including the flat film and the support film is separated from the cover film-attached film.

9 Claims, 1 Drawing Sheet

(30) Foreign Application Priority Data

Jun. 7, 2016 (JP) .................... 2016-113871
Jun. 7, 2016 (JP) .................... 2016-113872

(51) Int. Cl.

| | | |
|---|---|---|
| *B29C 41/02* | (2006.01) | |
| *B29C 41/44* | (2006.01) | |
| *B32B 27/06* | (2006.01) | |
| *B32B 37/26* | (2006.01) | |
| *B32B 27/08* | (2006.01) | |
| *B32B 27/28* | (2006.01) | |
| *B32B 27/30* | (2006.01) | |
| *B32B 27/34* | (2006.01) | |
| *B32B 3/26* | (2006.01) | |
| *B01D 69/02* | (2006.01) | |
| *B01D 69/10* | (2006.01) | |
| *B01D 69/12* | (2006.01) | |
| *B29L 31/14* | (2006.01) | |
| *B01D 67/00* | (2006.01) | |
| *B01D 71/48* | (2006.01) | |
| *B01D 71/64* | (2006.01) | |

(52) U.S. Cl.
CPC .......... *B29C 41/02* (2013.01); *B29C 41/44* (2013.01); *B32B 3/26* (2013.01); *B32B 27/06* (2013.01); *B32B 27/08* (2013.01); *B32B 27/281* (2013.01); *B32B 27/286* (2013.01); *B32B 27/30* (2013.01); *B32B 27/34* (2013.01); *B32B 37/26* (2013.01); *B01D 53/22* (2013.01); *B01D 67/0009* (2013.01); *B01D 67/0013* (2013.01); *B01D 71/48* (2013.01); *B01D 71/64* (2013.01); *B01D 2325/04* (2013.01); *B29L 2031/14* (2013.01); *B32B 2037/268* (2013.01); *B32B 2250/02* (2013.01); *B32B 2250/24* (2013.01); *B32B 2270/00* (2013.01); *B32B 2305/026* (2013.01); *B32B 2307/54* (2013.01); *B32B 2307/724* (2013.01); *B32B 2307/726* (2013.01); *B32B 2571/00* (2013.01)

(58) Field of Classification Search
CPC .......... B32B 7/12; B32B 27/06; B29C 41/02; B29C 41/44; B29L 2031/14
See application file for complete search history.

(56) References Cited

U.S. PATENT DOCUMENTS

| | | | |
|---|---|---|---|
| 2002/0162791 A1 | 11/2002 | Jacobson | |
| 2004/0142220 A1* | 7/2004 | Brenner | B01D 53/22 |
| | | | 429/411 |
| 2004/0247921 A1* | 12/2004 | Dodsworth | B32B 15/08 |
| | | | 428/544 |
| 2005/0092676 A1 | 5/2005 | Dalton et al. | |
| 2006/0263548 A1 | 11/2006 | Lagarde et al. | |
| 2007/0029256 A1 | 2/2007 | Nakano et al. | |
| 2008/0078675 A1* | 4/2008 | Kawahara | B01D 53/22 |
| | | | 204/295 |
| 2009/0029137 A1 | 1/2009 | Kunitake et al. | |
| 2011/0030382 A1* | 2/2011 | Eadon | B01D 53/22 |
| | | | 60/780 |
| 2011/0226686 A1 | 9/2011 | Maurer | |
| 2013/0087042 A1* | 4/2013 | Furuyama | B01D 39/1692 |
| | | | 95/47 |
| 2013/0333569 A1* | 12/2013 | Hara | B01D 53/22 |
| | | | 96/11 |
| 2014/0223873 A1 | 8/2014 | Warkiani et al. | |
| 2014/0230998 A1* | 8/2014 | Tani | B65C 9/24 |
| | | | 156/235 |
| 2014/0231006 A1* | 8/2014 | Tani | G09F 3/10 |
| | | | 156/289 |
| 2014/0318374 A1* | 10/2014 | Yano | F21V 31/03 |
| | | | 96/11 |
| 2015/0151527 A1* | 6/2015 | Teshima | A61B 6/4035 |
| | | | 378/36 |
| 2015/0192961 A1* | 7/2015 | Zhou | G06F 1/1652 |
| | | | 428/120 |
| 2015/0313943 A1 | 11/2015 | Kishikawa et al. | |
| 2015/0367335 A1 | 12/2015 | Okazaki | |
| 2016/0199790 A1 | 7/2016 | Usami et al. | |
| 2017/0259550 A1* | 9/2017 | Neton | B29C 59/005 |

FOREIGN PATENT DOCUMENTS

| | | |
|---|---|---|
| JP | 2004-057993 A | 2/2004 |
| JP | 2008-285617 | 11/2008 |
| JP | 2015-083296 | 4/2015 |
| WO | WO 01/41905 A1 | 6/2001 |
| WO | WO 2005/014149 A1 | 2/2005 |
| WO | WO 2013/043124 A1 | 3/2013 |
| WO | WO 2013/049936 A1 | 4/2013 |

OTHER PUBLICATIONS

Office Action issued to U.S. Appl. No. 14/748,932, dated Apr. 6, 2018.
Extended European search report issued in European Patent Application No. 15173691.5, dated Jan. 4, 2016.
Extended European search report issued in European Patent Application No. 16161477.1, dated May 11, 2017.
Office Action issued in U.S. Appl. No. 14/748,932, dated Nov. 24, 2017.
Office Action in U.S. Appl. No. 15/074,302, dated Jul. 19, 2018.

* cited by examiner

METHOD FOR MANUFACTURING LAMINATE, AND LAMINATE

RELATED APPLICATIONS

This application claims priority TO Japanese Patent Application No. 2016-005635, filed Jan. 14, 2016; Japanese Patent Application No. 2016-005636, filed Jan. 14, 2016; Japanese Patent Application No. 2016-113871, filed Jun. 7, 2016; and Japanese Patent Application No. 2016-113872, filed Jun. 7 2016, the contents of which are incorporated herein by reference.

BACKGROUND OF THE INVENTION

Field of the Invention

The present invention relates to a method for manufacturing a laminate composed of a flat film being a thin resin film, and a support film being a porous body, and to a laminate preferably manufactured with the manufacturing method.

Related Art

In recent years, self-standing thin films having a large surface area and a thickness on the order of nanometers, and being sufficiently permeable to allow micro substances to pass therethrough, have attracted attention as being usable, for example, as permselective membranes, micro sensors, drug delivery films, etc. For this reason, various studies have been made on methods for manufacturing permeable self-standing thin films; and examples of such methods known in the art include water surface casting methods, interface reaction methods using silane coupling agents, etc. The thin films obtained with these methods, however, generally suffer from problems such as poor mechanical strength, difficulties in increasing the area of the thin film, and limitation on accuracy of the thin film.

Polymer thin films, which are still self-standable with a thickness of 100 nm or less, are known as self-standing films (Patent Document 1). According to the method disclosed in Patent Document 1, polymer thin films are manufactured by providing a sacrificial layer on a surface of a support, subjecting a polymerizable compound in a composition to chain polymerization on the surface of the sacrificial layer, and subsequently removing the sacrificial layer to separate the polymerized composition from the support.

Further, a laminate has been proposed, in which a porous film with a certain level of thickness and a permeable thin film are stacked on top of each other for the purpose of compensating for the strength of the thin film without reducing the permeability of the thin film. A laminate, in which a gas separation membrane (a thin film) composed of polyimide and a thick porous film are stacked on top of each other, has been known as this type of laminate (Patent Document 2).

Patent Document 1: Japanese Unexamined Patent Application, Publication No. 2008-285617

Patent Document 1: Japanese Unexamined Patent Application, Publication No. 2015-83296

SUMMARY OF THE INVENTION

Indeed, the thin films manufactured with the method disclosed in Patent Document 1 are self-standable and extremely thin films with a thickness of 100 nm or less. However, the problem of strength with the thin films on the order of nanometers remains unsolved yet. Even in an attempt to use the thin film disclosed in Patent Document 1 for gas separation, if a difference in pressure is generated between both sides of the film during the separation, the film is likely to break.

On the other hand, the laminate disclosed in Patent Document 2 is manufactured by coating a coating solution containing a polyimide compound on a porous film, and subsequently removing the solvent. With the manufacturing method disclosed in Patent Document 1, however, the coating liquid containing a polyimide compound is disadvantageously impregnated into the pores of the porous film due to capillarity or the like. Therefore, according to the laminate disclosed in Patent Document 1, a gas permeation distance will be greater than a thickness of a gas separation membrane composed of polymide, by a thickness of the polyimide filled into the pores of the porous film. Accordingly, with the method disclosed in Patent Document 2, it is difficult to obtain a laminate having a desired gas separation capability, in particular, in the case of designing a gas separation membrane with a small thickness.

In contrast, the problem of filling the pores of the porous film with polyimide will not occur, if an extremely thin gas separation film with a solvent having been removed is directly stacked on a porous film. However, it is extremely difficult to stack an extremely thin gas separation film and a porous film on top of each other without causing breakage or cockles.

The present invention has been made in view of the above problems, and an object of the present invention is to provide: a method for manufacturing a laminate composed of a flat film being a thin resin film, and a support film being a porous body, in which the method can stack the flat film and the support film on top of each other, without filling the pores of the support film with a material of the flat film, and without causing breakage or cockles; a laminate that is preferably manufactured with the method, the laminate including the flat film permeable to gas and being not easily broken even when exposed to pressure; a gas filter including the laminate as a separation membrane; and a separation method using the filter.

The present inventors have found that the above problems can be solved by manufacturing a laminate with a method which includes: bringing a water-containing peeling liquid into contact with a thin flat film formed on a substrate, subsequently laminating a support film including a cover film having one main surface thereof such that the support film is in contact with the flat film, then separating a cover film-attached laminate composed of the flat film, the support film and a cover film from the substrate, and separating the laminate including the flat film and the support film from the cover film-attached laminate. The present inventors have further found that the above problems can be solved by using the laminate composed of the flat film and the support film, in which the flat film has a thickness 1000 nm or less and does not have through-pores with an opening diameter 1 nm or more; a porous film has a surface roughness of 100 nm or less; a plurality of openings in the main surface of the support film have an average diameter below 1000 nm; and the main surface of the support film has an opening ratio of 40 area % or less. In this manner, the present inventors have completed the present invention.

Namely, a first aspect of the present invention is:
a method for manufacturing a laminate composed of a flat film and a support film being a porous body, in which the method includes:

coating a resin solution on a substrate to form a coating film;
removing a solvent from the coating film to form a flat film;
bringing the flat film into contact with a water-containing peeling liquid;
laminating a support film including a cover film on one main surface thereof, such that the support film is in contact with the flat film;
separating a cover film-attached laminate including the flat film, the support film, and the cover film, from the substrate; and
separating the laminate from the cover film-attached laminate.

A second aspect of the present invention is a laminate composed of a flat film and a support film, in which the flat film has a thickness of 1000 nm or less, and does not have through-pores with an opening diameter of 1 nm or more; the support film is a porous film having a surface roughness of 100 nm or less;
a plurality of openings in the main surface of the support film have an average diameter below 1000 nm; and
the main surface of the support film has an opening ratio of 40 area % or less.

A third aspect of the present invention is a gas filter, which includes the laminate according to the second aspect as a separation membrane.

A fourth aspect of the present invention is a separation method using the filter according to the third aspect, in which the method includes:
separating a gas from a mixture including a solid and the gas, separating a gas from a mixture including a liquid and the gas, or
separating at least one gas from a mixed gas including two or more gases.

The present invention can provide: a method for manufacturing a laminate composed of a flat film being a thin resin film, and a support film being a porous body, in which the method can stack the flat film and the support film on top of each other, without filling the pores of the support film with a material of the flat film, and without causing breakage or cockles; a laminate that is preferably manufactured with the method, the laminate including a flat film permeable to gas, and being not easily broken even when exposed to pressure; a gas filter including the laminate as a separation membrane; and a separation method using the filter.

DETAILED DESCRIPTION OF THE INVENTION

<<Method for Manufacturing a Laminate>>

According to a method for manufacturing a laminate composed of a flat resin film and a support film being a porous body, the method includes:
coating a resin solution on a substrate to form a coating film (hereinafter also referred to as a "coating step");
removing a solvent from the coating film to form a flat film (hereinafter also referred to as a "flat film forming step");
bringing the flat film into contact with a water-containing peeling liquid (hereinafter also referred to as a "a contacting step");
laminating a support film having a cover film on one main surface thereof onto the flat film, such that the support film is in contact with the flat film (hereinafter also referred to as a "laminating step");
separating a cover film-attached laminate including the flat film, the support film, and the cover film, from the substrate (hereinafter also referred to as a "separating step"); and
separating the laminate from the cover film-attached laminate (hereinafter also referred to as a laminate obtaining step).

The above steps are hereinafter described with reference to FIGS. 1A to 1H. FIGS. 1A to 1H are cross-sectional views illustrating respective steps concerning a method for manufacturing a laminate as viewed from a sectional direction of a substrate 10.

<Coating Step>

Figure 1A:
FIG. 1A is a cross-sectional view of a substrate.
Figure 1B:
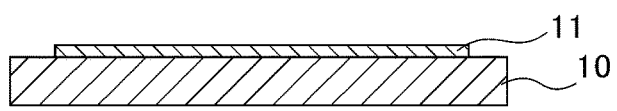
FIG. 1B is a cross-sectional view of a substrate with a coating film formed by coating a resin solution.

As illustrated in FIGS. 1A and 1B, in the coating step, a resin solution is coated on the substrate 10 to form a coating film 11. Examples of a method for coating the resin solution on the substrate 10 may include, for example, methods using contact transfer-type coating devices such as roll coaters, reverse coaters, and bar coaters, and noncontact-type coating devices such as spinners (rotatory coaters), curtain flow coaters, ink jet devices, and slit coaters. Among the coating methods, slit coaters are preferable in terms of being capable of easily forming a coating film 11 with an even thickness, even in the case of forming a coating film 11 with a large area.

A thickness of the coating film 11 is not limited in particular, and may be appropriately determined, depending on the thickness of a flat film 12 formed by removing a solvent from the coating film.

The top surface of the substrate 10 may be formed of any material without limitation in particular, as long as the material is not dissolved in the resin solution or a peeling liquid (to be described later), and is not swollen by the resin solution or the peeling liquid (to be described later). Examples of the material for the top surface of the substrate 10 may include inorganic materials, for example, glass or metals such as stainless steel, iron, copper, and aluminum, and various organic materials such as polyamides (nylon), polyesters (for example, PETs and PBTs), polystyrenes, epoxy resins, polyimide resins, and polyamide-imide resins.

A resin contained in the resin solution is not limited in particular, as long as the resin is soluble in solvents and a flat film 12 can be formed by removing the solvent from the coating film 11. However, water-soluble resins cannot be used. When a water-soluble resin is used, a water-soluble flat film 12 is formed. If the flat film 12 is soluble in water, the flat film 12 will be disadvantageously dissolved in a peeling liquid 13 in the contacting step (to be described later), and a laminate 17 with a desired structure cannot be formed. When the peeling liquid 13 contains an alcohol-containing aqueous solution, resins soluble in the alcohol can be used as the material for the flat film 12, as long as the flat film 12 is not excessively dissolved in the peeling liquid.

A rate of dissolution in water of the flat film 12 and a support film 14 (to be described later) is preferably 1 nm/sec or less, in terms of resistance to the peeling liquid 13.

A resin may be appropriately selected, depending on the type of solvents and the type of gasses that permeate the laminate 17 in the separation using the laminate 17. Examples of preferable resins may include, for example, polyamic acids, polyimides, polybenzoxazoles, epoxy resins, acrylic resins, etc. Further, styrenic polymers such as isoprene-butadiene-styrenecopolymers, hydrogenation products of isoprene-butadiene-styrenecopolymers, butadiene-styrene copolymers, hydrogenation products of butadiene-styrene copolymers, isoprene-styrene copolymers, hydrogenation products of isoprene-styrene copolymers, ethylene-propylene-styrene copolymers, propylene-styrene copolymers, ethylene-styrene copolymers, ethylene-propylene-1-butene-styrene copolymers, and polystyrene are also preferable. Cycloolefinic copolymers such as ethylene-norbornene copolymers, propylene-norbornene copolymers, ethylene-tetracyclodecene copolymers, propylene-tetracyclodecene copolymers, ethylene-propylene-norbornene copolymers, and ethylene-propylene-tetracyclodecene copolymers are also preferable. In the case in which the resin is a copolymer, the copolymer may be either a random copolymer or a block copolymer. In the case in which the resin is a block copolymer containing styrene-derived units, a block copolymer having blocks of units derived from styrene at both ends of the molecular chain is preferable. Further, the preferable resin may contain a hydroxyl group at both ends or one end of the molecular chain.

A solvent contained in the resin solution is appropriately selected, depending on the type of the resin. Examples of preferable solvents may include: aliphatic monoalcohols such as methanol, ethanol, n-propanol, isopropanol, n-butanol, isobutanol, n-pentanol, n-hexanol, and 2-ethylhexyl alcohol; polyhydric alcohols such as ethylene glycol, propylene glycol, diethylene glycol, dipropylene glycol, and glycerin; ethylene glycol dimonoalkyl ether acetates such as ethylene glycol monomethyl ether acetate, and ethylene glycol monoethyl ether acetate; propylene glycoldimonoalkyl ethers such as propylene glycol monomethyl ether, propylene glycol monoethyl ether, propylene glycol monopropyl ether, and propylene glycol monobutyl ether; propylene glycol dialkyl ethers such as propylene glycol dimethyl ether, propylene glycol diethyl ether, propylene glycol dipropyl ether, and propylene glycol dibutyl ether; propylene glycoldimonoalkyl ether acetates such as propylene glycol monomethyl ether acetate, propylene glycol monoethyl ether acetate, propylene glycolmonopropyl ether acetate, and propylene glycol monobutyl ether acetate; cellosolves such as ethylcellosolve and butylcellosolve; carbitols such as butyl carbitol; lactic acid esters such as methyl lactate, ethyl lactate, n-propyl lactate, and isopropyl lactate; aliphatic carboxylic acid esters such as ethyl acetate, n-propyl acetate, isopropyl acetate, n-butyl acetate, isobutyl acetate, n-amyl acetate, isoamyl acetate, isopropyl, n-butyl propionate, and isobutyl propionate; other esters such as methyl 3-methoxypropionate, ethyl 3-methoxypropionate, methyl 3-ethoxypropionate, ethyl 3-ethoxypropionate, methyl pyruvate, and ethyl pyruvate; aromatic hydrcarbons such as toluene and xylene; ketones such as acetone, methyl ethyl ketone, 2-heptanone, 3-heptanone, 4-heptanone, and cyclohexanone; amides such as N-dimethylamide, N-methylacetamide, N,N-dimethylacetamide, and N-methylpyrrolidone; lactones such as γ-butyrolactone; etc.

The area of the main surface of the laminate 17 manufactured according to any aspect of the present invention is preferably 10 $cm^2$ or more. According to the aspects of the present invention described herein, a laminate 17 having a main surface area of 10 $cm^2$ or more can be easily manufactured. Therefore, the area of the main surface of the flat film 12 is also preferably 10 $cm^2$ or more, more preferably 20 $cm^2$ or more, and particularly preferably 30 $cm^2$ or more. The area of the main surface of the flat film 12 is preferably the same as that of the main surface of the laminate 17; however, the area of the main surface of the flat film 12 may be different from that of the main surface of the laminate 17, as long as the difference does not adversely affect the use of the laminate 17.

Further, when removing the solvent in the formation of the flat film 12, the area of the flat film 12 may be smaller than that of the coating film 11 in some cases. In this case, the area of the coating film 11 is determined by taking into consideration the level of shrinkage caused by the removal of the solvent.

<Flat Film Forming Step>

Figure 1C:
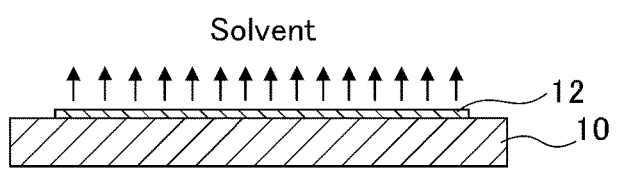
FIG. 1C is a view illustrating a step of removing a solvent from a coating film on a substrate to form a flat film.

As illustrated in FIGS. 1B and 1C, in the flat film forming step, a flat film 12 is formed by removing the solvent from the coating film 11. The solvent may be removed by any method without limitation in particular, as long as cockles are not generated in the flat film 12, or heat deterioration does not occur in the flat film 12. Examples of the method for removing the solvent may include, for example, a method of heating the coating film 11 on the substrate 10 under atmospheric pressure or reduced pressure, a method of air-drying the coating film 11 through exposure to an air stream or an inert gas stream such as nitrogen, and a method of placing the coating film 11 under a reduced pressure atmosphere at a temperature around room temperature.

In the case in which the coating film 11 is heated to remove the solvent, the heating temperature may be appropriately determined by taking into consideration, for example, the boiling point of the solvent, and the material of the flat film 12. Attention should be paid, if the heating temperature or the rate of temperature increase is excessively high, air bubbles or cockles may be generated in the flat film 12.

A thickness of the flat film 12 is not limited in particular, and is preferably 1000 nm or less, more preferably 500 nm or less, and particularly preferably 100 nm or less. In the case in which the laminate 17 that is manufactured according to any aspect of the present invention is used as a filter, gases that favorably permeate the flat film 12 are separated from gases, liquids, or solids that are less likely to permeate or cannot permeate the flat film 12. In this case, the separation efficiency of the laminate 17 will be improved when a desired type of gas favorably permeates the flat film 12; therefore, the film thickness of the flat film 12 is preferably as thin as possible.

It is preferable that the flat film 12 does not have openings with a diameter of 1 nm or more. As described above, the laminate 17 manufactured according to any aspect of the present invention can be used for the separation of gases. When openings with a diameter of 1 nm or more exist in the flat film 12, undesired ingredients may be likely to permeate the laminate 17 in some cases.

A tensile strength of the flat film 12 is not limited in particular. When the laminate 17 is used as a filter, the tensile strength of the flat film 12 is preferably 1 to 5 GPa, in terms of being likely to suppress the flat film 12 from breaking.

<Contacting Step>

Figure 1D:
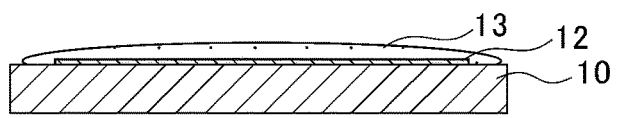
FIG. 1D is a view illustrating a step of bringing a water-containing peeling liquid into contact with a flat film provided on a substrate.

As illustrated in FIG. 1D, in the contacting step, the flat film 12 is brought into contact with a water-containing peeling liquid 13. The peeling liquid 13 is not limited in particular, as long as the liquid is a water-containing liquid, and does not dissolve or swell the flat film 12 and the support film 14.

The surface tension of the peeling liquid 13 is preferably 10 to 75 mN/m, and more preferably 10 to 50 mN/m, in terms of being likely to favorably wet the flat film 12 with the peeling liquid 13. A method for regulating the surface tension of the peeling liquid 13 is not limited in particular. The surface tension of the peeling liquid 13 is typically regulated by adding various additives to water. Examples of preferable additives include water-soluble organic solvents and surfactants. Examples of the water-soluble organic solvents may include, for example, alcohols such as methanol, ethanol, n-propanol, isopropanol, ethylene glycol, and glycerin; propylene glycol monomethyl ether acetate, etc. Any of anionic surfactants, cationic surfactants, nonionic surfactants, and amphoteric surfactants may be used as the surfactant.

Water-soluble organic solvents are preferable as the additive used for surface tension regulation purposes, since no matter will adhere to the laminate 17 after drying the peeling liquid 13. Among the water-soluble organic solvents, alcohols are preferable, methanol, ethanol, n-propanol, and isopropanol are more preferable, and methanol and ethanol are particularly preferable, which easily regulate the surface tension of the peeling liquid 13 and easily dry.

The cover film-attached laminate 16 can be easily separated from the substrate 10 without, for example, breaking the flat film 12 in the separating step (to be described later), by wetting the flat film 12 on the substrate 10 with the peeling liquid 13. It is considered that the adhesion between the substrate 10 and the flat film 12 is lowered by the entry of the peeling liquid 13 into extremely small gaps between the substrate 10 and the flat film 12.

A method for bringing the flat film 12 into contact with the peeling liquid 13 is not limited in particular. Example of the contacting method may include a method of coating or spreading the peeling liquid 13 on the flat film 12, a method of circulating the peeling liquid 13 on the flat film 12, and a method of immersing the flat film 12 in the peeling liquid.

A temperature of the peeling liquid 13 when the peeling liquid 13 is brought into contact with the flat film 12 is not limited in particular, as long as the flat film 12 is not swollen or dissolved at the temperature. The temperature of the peeling liquid 13 may be a temperature that is not significantly different from room temperature. The temperature is typically approximately 0 to 50° C., preferably 5 to 45° C., and more preferably 10 to 40° C.

<Laminating Step>

Figure 1E:
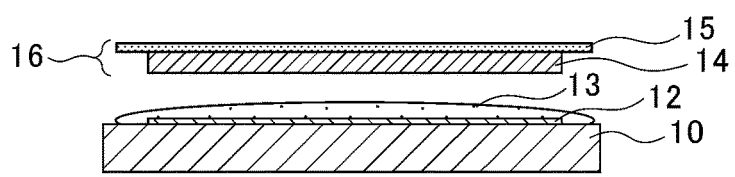
FIG. 1E is a view illustrating a flat film wetted with a peeling liquid and provided on a substrate, and a support film to be laminated onto the flat film, the support film having a cover film on one main surface thereof.
Figure 1F:
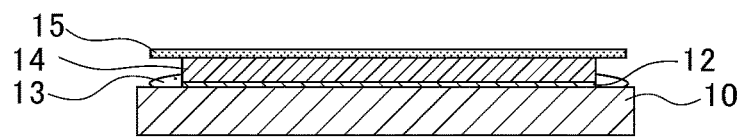
FIG. 1F is a view illustrating a state in which a support film having a cover film on one main surface thereof and a flat film provided on a substrate are laminated on top of each other, such that the support film is in contact with the flat film.

As illustrated in FIGS. 1E and 1F, in the laminating step, a support film 14 having a cover film 15 on one main surface is laminated onto the flat film 12, such that the support film 14 is in contact with the flat film 12. The support film 14 will be described later in detail.

The laminating method is not limited in particular, and any well-known method may be employed. Examples of a preferable method may include, for example, thermocompression of the support film 14 including the cover film 15 to the flat film 12, by using rolls or the like with a pressure at a level that will not break the support film 14 and the flat film 12. In this case, a roller pressure for thermocompression is preferably 0.1 to 10 kgf/cm$^2$, and more preferably 0.2 to 5 kgf/cm$^2$. The temperature of the roller is preferably 20 to 120° C., and more preferably 25 to 100° C.

A material for the cover film 15 is not limited in particular, as long as the cover film 15 formed of the material can be laminated on the support film 14. A material for the cover film 15 may be organic materials or inorganic materials, and is preferably organic materials. Resins are usually used as the organic material. Examples of the resins may include, for example, polyacetals, polyamides, polycarbonates, polyesters (for example, polybutylene terephthalate, polyethylene terphthalate, and polyallylate), FR-AS resins, FR-ABS resins, AS resins, ABS resins, polyphenylene oxides, polyphenylene sulfides, polysulfones, polyethersulfones, polyether ether ketones, fluororesins (for example, polytetrafluoroethylene, polyvinylidene fluoride), polyimides, polyamide-imides, polyamide bismaleimides, polyetherimides, polybenzoxazoles, polybenzothiazoles, polybenzoimidazoles, silicone resins, BT resins, polymethylpentenes, ultrahigh molecular-weight polyethylenes, FR-polypropylenes, (meth)acrylic resins (for example, polymethyl methacrylate), polystyrenes, etc. Among these resins, for example, polyesters, polycarbonates, (meth)acrylic resins, polystyrenes, polyimides, polyethylenes, and polypropylenes are preferable, in terms of being readily available.

The thickness of the cover film 15 is not limited in particular. The thickness of the cover film is, for example, preferably 10 to 100 μm, and more preferably 10 to 50 μm.

A method for preparing the support film 14 having the cover film 15 on one main surface thereof is not limited in particular. The support film 14 with the cover film 15 may be prepared by laminating the cover film 15 and the support film 14 on top of each other with a well-known method. Examples of a preferable method may include, for example, thermocompression of the cover film 15 to support film 14, by using rolls or the like with a pressure at a level that will not break the support film 14.

The cover film 15 is preferably applied onto one main surface of the support film 14 through an adhesive layer (not shown). Specifically, the adhesive layer preferably exists between the cover film 15 and the support film 14. In the case in which the adhesive layer exists, when the cover film-attached laminate 16 including the flat film 12, the support film 14 and the cover film 15 is separated from the substrate 10 in a separating step (to be described later), separation of only the cover film 15 from the substrate can be easily prevented.

A method for providing the adhesive layer is not limited in particular. As a preferable method, a method of removing a solvent after coating a solution of an adhesive layer material onto the cover film 15 or the support film 14 is preferable. The adhesive layer is preferably provided on the cover film 15, since the surface of the support film 14 is not blocked by the material for the adhesive layer when forming the adhesive layer.

A material for the adhesive layer is not limited in particular, as long as the material can bond the cover film 15 to the support film 14. Examples of preferable materials for the adhesive layer include non-crystalline polyesters, styrenic resins, olefinic resins, etc.

When the material for the adhesive layer is an organic material, the glass transition point of the organic material is preferably 80° C. or below, and more preferably 50° C. or below. When the glass transition point of the material for the adhesive layer is at a temperature within the above-defined range, the support film 14 having the cover film 15 thereon can be laminated onto the flat film 12, while heating at a low temperature to a degree that will not adversely affect the flat film 12, the support film 14, the cover film 15 and the like. In this case, the adhesive layer is softened to favorably bond the cover film 15 to the support film 14.

Before the lamination of the support film 14 having the cover film 15 thereon, the support film 14 having the cover film 15 thereon may be heated to a temperature above the softening point of the adhesive layer. In this case as well, the cover film 15 and the support film 14 are favorably bonded to each other.

The vaporization of the peeling liquid 13 is suppressed, since the flat film 12 wetted with the peeling liquid 13 is covered with the cover film 15. By virtue of this, in the next separating step, the cover film-attached laminate 16 including the flat film 12, the support film 14 and the cover film 15 can be favorably separated from the substrate 10.

<Separating Step>

Figure 1G:
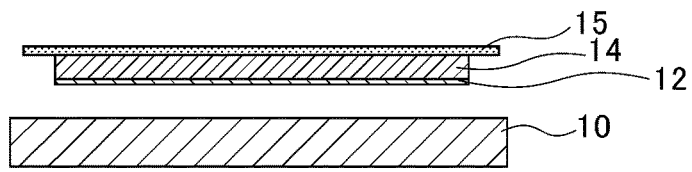
FIG. 1G is a view illustrating a step of separating a cover film-attached laminate including a flat film, a support film and a cover film, from a substrate.

As illustrated in FIGS. 1F and 1G, in the separating step, the cover film-attached laminate 16 including the flat film 12, the support film 14 and the cover film 15 is separated from the substrate 10. A method for such separation is not limited in particular. For example, the cover film-attached laminate 16 is separated from the substrate 10 by holding the end of the cover film 15, for example, with fingers or a pair of tweezers. In this case, when the flat film 12 in direct contact with the substrate 10 is wetted with the peeling liquid 13, the cover film-attached laminate 16 can be easily separated from the substrate 10 without breaking the flat film 12 or causing other unfavorable phenomena.

<Laminate Obtaining Step>

Figure 1H:
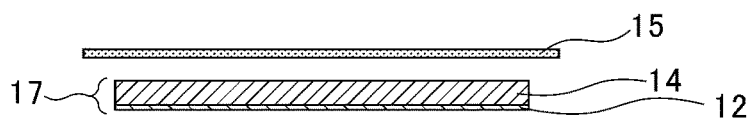
FIG. 1H is a view illustrating a step of separating a laminate composed of a flat film and a support film, from a cover film-attached laminate including a flat film, a support film and a cover film.

As illustrated in FIG. 1H, in the laminate obtaining step, the laminate 17 composed of the flat film 12 and the support film 14 is separated from the cover film-attached laminate 16 including the flat film 12, the support film 14 and the cover film 15. A method for separating the laminate 17 from the cover film-attached laminate 16 is not limited in particular. Examples of a preferable method may include, for example, a method in which, after forming a gap between the cover film 15 and the laminate 17 by bending the end of the cover film-attached laminate, at least one of the laminate 17 and the cover film 15 is held, and the cover film-attached laminate 16 and the laminate 17 are separated from each other.

The laminate 17 thus obtained has a high strength as well, since the thin flat film 12 is favorably permeable to gas, and the support film 14 is also provided. Therefore, the laminate 17 is preferably used for separating a specific gas from a mixed gas by selective permeation of gas, gas-liquid separation of a gas-containing liquid, and solid-gas separation of a gas containing solid particles.

<Support Film>

The support film 14 is a porous film composed of a porous body. When the porous film is used as the support film 14, the flat film 12 is supported on the support film 14 so as to avoid breaking the extremely thin flat film 12; and various fluids can be allowed to circulate inside the laminate 17 so that a gas to be separated arrives at the flat film 12.

The porous film used as the support film 14 is hereinafter described.

A material for the porous film is not limited in particular, and may be an organic material or an inorganic material. The porous film is preferably formed of an organic material, in terms of being easy to manufacture a porous film with a desired pore diameter and porosity. Such organic materials are typically resins. The resins exemplified as the material for the cover film 15 are preferably used as the resin. Among the resins, polyvinylidene fluorides, polyethersulfones, polyimides, and polyamide-imides are preferable, in terms of being easy to obtain porous films that are thermally or chemically stable and have excellent mechanical strength. The porous film may be formed of a mixture of two or more resins.

The surface roughness (Ra) of the porous film is preferably 100 nm or less, and more preferably 90 nm or less. The surface roughness of the porous film is defined as an average of surface roughness values at any three points in a porous film sample having a size of 5 cm×5 cm. When the surface roughness (Ra) of the porous film used as the support film 14 is 100 nm or less, the flat film 12 and the support 14 are less likely to separate while manufacturing the laminate 17.

The porous film has a plurality of openings in a main surface. The average diameter of the plurality of openings in the main surface of the porous film is preferably below 1000 nm, more preferably 900 nm or less, particularly preferably 700 nm or less, and most preferably 500 nm or less. The average diameter of the plurality of openings in the main surface of the porous film is determined by observing the surface of the porous film under a scanning electron microscope (SEM) at a magnification of 1000 times and measuring the areas of openings with an image analysis software (Image J). The average diameter is calculated as an average of diameters of 10 or more openings. The diameter of the opening is an equivalent circular diameter calculated from the area of the opening. When the outer edge of holes in the surface is unclear, for example, for the reason that holes within the film are visible in the image analysis, a range from a dark area to a third contrast peak in color contrast peaks was chosen to identify the opening in the surface of the porous film.

An excessively large average diameter of openings in the surface of the porous film used as the support film 14 is disadvantageous, since the flat film 12 and the support film 14 are likely to separate, or a laminate 17 having an excellent pressure resistance is less likely to be obtained, while manufacturing the laminate 17.

The opening ratio of the main surface of the porous film is preferably 40 area % or less, in relation to the area of the main surface. The opening ratio of the main surface of the porous fil may be determined by measuring the area of openings by an image analysis by the same method as the method for measuring the average diameter of the plurality of openings in the main surface of the porous film. An opening ratio of the main surface of the porous film above 40 area % is disadvantageous, since the flat film 12 and the support film 14 are likely to separate, or a laminate 17 having an excellent pressure resistance is less likely to be obtained.

A shape of the pores existing in the porous film is not limited in particular, as long as, when the laminate 17 including the porous film as the support film 14 is used, the fluid can flow from openings in the surface of the support film 14 to the surface of the flat film 12. For example, the porous film may be a porous film having a number of through-holes penetrating the film in the thickness direction or a porous film having a structure having a number of pores that are in communication with each other (hereinafter abbreviated to "continuous pores"). This type of porous film is preferably a porous film having a structure including spherical pores that are in communication with each other (hereinafter abbreviated to "continuous pores"), in terms of being easy to manufacture the porous film, and easy to circulate a fluid into pores even when the average opening diameter and the opening ratio of the main surface of the porous film is small.

The spherical shape regarding the pore shape is a concept including a perfectly spherical shape, and is not necessarily limited to only the perfectly spherical shape. The spherical shape may be a substantially perfectly spherical shape, and a shape that is recognized as an approximately spherical shape when a magnified pore image is visually inspected, is also included in the spherical shape. Specifically, the spherical pore may be such that the surface that defined the pore is a curved surface and the perfectly or substantially spherical pore is defined by the curved surface. When the porous film contains spherical pores, the average diameter of the spherical pores is preferably below 1000 nm.

Individual spherical pores are typically pores formed by removing individual fine particles existing in a resin-fine particle composite film (to be described later) in a subsequent step. Alternatively, the continuous pores may be formed by removing a plurality of fine particles existing in contact with each other in a resin-fine particle composite film in a subsequent step of a method for manufacturing a porous film (to be described later). Places where spherical pores in communication with each other in the continuous pores are derived from places where a plurality of fine particles to be removed are in contact with each other.

The air permeability of the porous film is appropriately determined so that the support film 14 has a desired permeability. The air permeability (Gurley permeability) of the support film 14 is preferably 1 to 300 sec/100 cc, and more preferably 5 to 200 sec/100 cc. The air permeability is regulated by regulating the average diameter of openings and the opening ratio of the porous film.

A method for manufacturing the porous film is not limited in particular. Examples of a preferable method for manufacturing preferable porous films having continuous pores composed of spherical pores may include, for example, methods disclosed in PCT International Publication No. WO 2014/175011 or Japanese Unexamined Patent Application, Publication No. 2014-214767.

<<Laminate>>

A preferable laminate that can be manufactured with the above-described method for manufacturing a laminate is hereinafter described. The laminate to be described below may be manufactured with any manufacturing method other than the above-described method for manufacturing a laminate. The laminate 17 is composed of a thin flat film 12 having a thickness of 1000 nm or less, and a support film 14 that supports the flat film. The flat film 12 and the support film 14 is hereinafter described.

<Flat Film>

The flat film 12 has a thickness of 1000 nm or less, and does not have through-pores with an opening diameter of 1 nm or more. A thickness of the flat film 12 is not limited in particular, and is preferably 1000 nm or less, more preferably 500 nm or less, and particularly preferably 100 nm or less. When the laminate 17 including a flat film 12 is used as a filter, gases that favorably permeate the flat film 12 are separated from gases, liquids, or solids that are less likely to permeate or cannot permeate the flat film 12. In this case, the separation efficiency of the laminate 17 will be improved when a desired type of gas favorably permeates the flat film 12; therefore, the film thickness of the flat film is preferably as thin as possible.

The flat film 12 does not have openings with a diameter of 1 nm or more. The laminate 17 including the flat film 12 can be used for the separation of gases. When openings with a diameter of 1 nm or more exist in the flat film 12, undesired ingredients may be likely to permeate the laminate 17.

Tensile strength of the flat film 12 is not limited in particular. The tensile strength of the flat film 12 is preferably 1 to 5 GPa, in terms of being easy to suppress the flat film 12 from breaking when the laminate 17 is used as a filter.

As described above, the above-described method using a water-containing peeling liquid is preferable as a method for manufacturing a laminate 17 composed of a flat film 12 and a support film 14. For this reason, a rate of dissolution in water of the flat film 12 and the support film 14 (to be described later) is preferably 1 nm/sec or less, in terms of resistance to the peeling liquid 13.

A material for the flat film is not limited in particular. The material for the flat film is preferably a resin, in terms of the processability, etc. The resin may be appropriately selected, depending on the type of a gas that permeates the laminate when the separation is carried out using the laminate. Examples of preferable resins are the same as those described above as used in the preparation of a resin solution usable in the formation of the flat film 12.

The laminate 17 preferably has a main surface area of 3 $cm^2$ or more. Accordingly, the area of the main surface of the flat film 12 is also preferably 3 $cm^2$ or more, more preferably 10 $cm^2$ or more, and particularly preferably 30 $cm^2$ or more. The area of the main surface of the flat film 12 is preferably the same as that of the main surface of the laminate; however, the area of the main surface of the flat film 12 may be different from that of the main surface of the laminate 17, as long as the difference does not adversely affect the use of the laminate 17.

<Support Film>

The support film 14 is a porous film composed of a porous body. When the porous film is used as the support film, the flat film 12 is supported on the support film 14 so as to avoid breaking the extremely thin flat film 12; and various fluids can be allowed to circulate inside the laminate 17 so that a gas that is an object to be separated arrives at the flat film 12.

The porous film used as the support film 14 is hereinafter described.

A material for the porous film is not limited in particular, and may be an organic material or an inorganic material. An organic material is preferable as a material for the porous film, in terms of being easy to form a porous film having a desired pore diameter and porosity. Such organic materials are typically resins. Examples of preferable resins are the same as those exemplified as resins preferable as materials for the cover film 15 in the description of the method for manufacturing a laminate. Among the resins, polyvinylidene fluorides, polyethersulfones, polyimides, and polyamide-imides are preferable, in terms of being easy to obtain porous films that are thermally or chemically stable and have excellent mechanical strength. The porous film may be formed of a mixture of two or more resins.

The surface roughness (Ra) of the porous film is preferably 100 nm or less, and more preferably 90 nm or less. The surface roughness of the porous film is defined as an average of surface roughness values at any three points in a porous film sample having a size of 5 cm×5 cm. When the surface roughness (Ra) of the porous film used as the support film 14 is 100 nm or less, the separation between the flat film 12 and the support is less likely to occur during the manufacture of the laminate 17.

The porous film has a plurality of openings in a main surface. A preferable range of an average diameter of a plurality of openings in a main surface of the porous film, and a method for measuring the average diameter of a plurality of openings in the main surface of the porous film, are the same as the range and the measuring method as described above in connection with the method for manufacturing the laminate 17.

An excessively large average diameter of openings in the surface of the porous film used as the support film is disadvantageous, since the flat film and the support film are likely to separate, or a laminate 17 having an excellent pressure resistance is less likely to be obtained, while manufacturing the laminate 17. Further, an excessively large average diameter of openings in the surface of the porous film is disadvantageous, since the permeability selectivity for a plurality of gases may be lowered, when the laminate 17 is used for separating a plurality of gases.

A preferable range of the opening ratio of the main surface of the porous film, and problems that occur when the opening ratio of the main surface of the porous film is excessively high, are the same as the range and the problems described above in connection with the method for manufacturing the laminate 17.

The shape of the pores existing in the porous film is as described above in the method for manufacturing the laminate 17. As described above, this type of porous film is preferably a porous film having a structure including spherical pores in communication with each other (hereinafter abbreviated to "continuous pores"), in terms of being easy to manufacture the porous film, and easy to circulate a fluid inside pores even when the average opening diameter and the opening ratio of the main surface of the porous film is small. The definition of the spherical shape, and the preferable range of the average diameter of spherical pores, are also as described above in connection of the method for manufacturing the laminate 17.

When the porous film contains continuous pores formed of spherical pores in communication with each other, the spherical shape and the typical method for manufacturing continuous pores are as described above in connection with the method for manufacturing the laminate 17.

The preferable range of the air permeability of the porous film, and the method for regulating the air permeability of the porous film, are as described above in connection with the method for manufacturing the laminate 17.

A method for manufacturing the porous film is not limited in particular. As described above, examples of a preferable method for manufacturing preferable porous films having continuous pores composed of spherical pores may include, for example, methods disclosed in PCT International Publication No. WO 2014/175011 or Japanese Unexamined Patent Application, Publication No. 2014-214767.

The above-described laminate 17 composed of a thin flat film 12 having a thickness of 1000 nm or less, and a support film 14 that supports the flat film 12, are preferably manufactured with the above-described method for manufacturing a laminate.

<<Gas Filter>>

The laminate is preferable as separation membranes for gas filters. Preferable examples of separation by way of the gas filter include:

separating a gas from a mixture including a solid and the gas;

separating a gas from a mixture including a liquid and the gas; or separating at least one gas from a mixed gas including two or more gases. The laminate, when mounted on the separation membrane, may be folded in a bellow form or rolled, as long as the laminate is not broken.

Extremely small solid particles and extremely small liquid droplets can be favorably separated from gases by separation using the laminate. Further, gases having a small molecular size such as hydrogen or helium may selectively permeate, by taking advantage of difference in molecular size. The selective permeation refers to preferential permeation of gases having a low molecular weight rather than permeation of only gases having a low molecular weight.

EXAMPLES

The present invention is hereinafter described in more detail with reference to Examples; however, the present invention should not be construed to be limited to these Examples.

Example 1

A solution of a polyamic acid in N-methylpyrrolidone (solid content 2% by mass) was coated on a glass substrate with a slit coater to form a coating film. The coating film was heated at 80° C. for 2 min to form a flat film having a size of 370 cm in length×470 cm in width×100 nm in thickness. A polyamic acid derived from 3,3',4,4'-biphenyltetracaboxylic dianhydride and 4,4'-diaminodiphenyl ether was used as the polyamic acid.

Separately, a laminate composed of a polyethylene terephthalate film (cover film) having a size of 25 cm×15 cm and a thickness of 50 μm and a polyimide porous film (support film) having a size of 20 cm×10 cm and a thickness of 20 μm stacked on top of each other through an adhesive layer composed of non-crystalline polyester (glass-transition temperature: 50° C.) having a thickness of 10 μm was prepared.

A polyimide resin derived from 3,3',4,4'-biphenyltetracaboxylic dianhydride and 4,4'-diaminodiphenyl ether was used as the material for the support film. A porous film having continuous pores composed of spherical pores was used as the support The average diameter of openings in the surface of the support film, the opening ratio of the surface of the support film, and the surface roughness were 216 nm, 20.3 area %, and 86 nm, respectively.

Subsequently, an aqueous ethanol solution having a concentration of 50% by mass (surface tension: 28 mN/m) was spread on the flat film on the substrate. After the spreading of the aqueous ethanol solution, the laminate including the cover film and the support film was stacked on the flat film under conditions of a roller pressure of 3 kgf/cm$^2$, a roller temperature of 60° C., and a roller speed of 0.4 m/min so that the support film was located on the flat film.

After stacking, while holding the end of the cover film, the laminate including the flat film, the support film and the cover film was separated from the substrate. Subsequently, in the laminate including the flat film, the support film, and the cover film, a laminate composed of the flat film and the support film was separated so that the adhesive layer remained unseparated on the cover film.

The method described above in Example 1 succeeded in manufacturing a laminate composed of a flat film being a thin resin film and a support film being a porous body, without causing breakage or cockles in the flat film.

Comparative Example 1

A laminate composed of a flat film and a support film was formed in the same manner as in Example 1, except that the aqueous ethanol solution was not spread. In this case, however, in an attempt to separate the laminate including the flat film, the support film, and the cover film, the laminate including the cover film and the support film was disadvantageously separated from the flat film due to strong intimate contact of the flat film with the substrate.

Comparative Example 2

A laminate composed of a flat film and a support film was formed in the same manner as in Example 1, except that ethanol was spread instead of the aqueous ethanol solution. In this case, however, in an attempt to separate the laminate including the flat film, the support film, and the cover film, the laminate including the cover film and the support film was disadvantageously separated from the flat film due to strong intimate contact of the flat film with the substrate.

Example 2

A laminate composed of a flat film and a support film was formed in the same manner as in Example 1, except that the thickness of the flat film was changed to 800 nm. The method described above in Example 2 also succeeded in manufacturing a laminate composed of a flat film being a thin resin film and a support film being a porous body, without causing breakage or cockles in the flat film by.

Example 3

A laminate composed of a flat film and a support film was formed in the same manner as in Example 1, except that the porous film of polyimide was changed to a porous film of a polycarbonate having a thickness of 25 µm, an average diameter of surface openings of 441 nm, a surface opening ratio of 26.5 area %, and a surface roughness of 24 nm. The porous film of the polycarbonate was one having a plurality of through-pores penetrating the film in the thickness direction. The method described above in Example 3 also succeeded in manufacturing a laminate composed of a flat film being a thin resin film and a support film being a porous body, without causing breakage or cockles in the flat film.

Example 4

A laminate composed of a flat film and a support film was formed in the same manner as in Example 1, except that the material for the flat film was changed to a polyimide resin derived from 3,3',4,4'-biphenyltetracaboxylic dianhydride and 4,4'-diaminodiphenyl ether. The method described above in Example 4 also succeeded in manufacturing a laminate composed of a flat film being a thin resin film and a support film being a porous body, without causing breakage or cockles in the flat film.

Example 5

A laminate composed of a flat film and a support film was formed in the same manner as in Example 1, except that the material for the flat film was changed to a hydrogenation product of a hydroxyl-terminated styrene-isoprene-butadiene-styrene block copolymer and the solvent used in the preparation of the resin solution for flat film formation was changed to decahydronaphthalene (decalin). The method described above in Example 5 also succeeded in manufacturing a laminate composed of a flat film being a thin resin film and a support film being a porous body, without causing breakage or cockles in the flat film.

Example 6

A laminate composed of a flat film and a support film was formed in the same manner as in Example 1, except that the material for the flat film was changed to a hydrogenation product of a styrene-isoprene-styrene block copolymer and the solvent used in the preparation of the resin solution for flat film formation was changed to decahydronaphthalene (decalin). The method described above in Example 6 also succeeded in manufacturing a laminate composed of a flat film being a thin resin film and a support film being a porous body, without causing breakage or cockles in the flat film.

Example 7

A laminate composed of a flat film and a support film was formed in the same manner as in Example 1, except that the material for the flat film was changed to an ethylene-tetracyclododecene copolymer and the solvent used in the preparation of the resin solution for flat film formation was changed to decahydronaphthalene (decalin). The method described above in Example 7 also succeeded in manufacturing a laminate composed of a flat film being a thin resin film and a support film being a porous body, without causing breakage or cockles in the flat film.

Example 8

A laminate composed of a flat film and a support film was formed in the same manner as in Example 1, except that the material for the flat film was changed to polystyrene and the solvent used in the preparation of the resin solution for flat film formation was changed to propylene glycol 1-monomethyl ether 2-acetate (PGMEA). The method described above in Example 8 also succeeded in manufacturing a laminate composed of a flat film being a thin resin film and a support film being a porous body, without causing breakage or cockles in the flat film.

Example 9

A solution of a polyamic acid in N-methylpyrrolidone (solid content 2% by mass) was coated on a glass substrate with a spin coater to form a coating film. The coating film was heated at 80° C. for 1 min to form a flat film having a size of 10 cm in length×10 cm in width×100 nm in thickness. A polyamic acid derived from 3,3',4,4'-biphenyltetracaboxylic dianhydride and 4,4'-diaminodiphenyl ether was used as the polyamic acid.

Separately, a laminate composed of a polyethylene terephthalate film (cover film) having a size of 15 cm×15 cm and a thickness of 50 µm and a polyimide porous film (support film) having a size of 5 cm×5 cm and a thickness of 20 µm stacked on top of each other through an adhesive layer composed of non-crystalline polyester (glass-transition temperature: 50° C.) having a thickness of 10 µm was prepared.

A polyimide resin derived from 3,3',4,4'-biphenyltetracaboxylic dianhydride and 4,4'-diaminodiphenyl ether was used as the material for the support film. A porous film including continuous pores composed of spherical pores was used as the support The average diameter of openings in the surface of the support film, the opening ratio of the surface of the support film, and the surface roughness were 216 nm, 20.3 area %, and 86 nm, respectively.

Subsequently, an aqueous ethanol solution having a concentration of 50% by mass (surface tension: 28 mN/m) was spread on the flat film on the substrate. After spreading the aqueous ethanol solution, the laminate including the cover film and the support film was stacked on the flat film under conditions of a roller pressure of 3 kgf/cm², a roller temperature of 60° C., and a roller speed of 0.4 m/min so that the support film was located on the flat film.

After stacking, while holding the end of the cover film, the laminate including the flat film, the support film and the cover film was separated from the substrate. Subsequently, in the laminate thus obtained, including the flat film, the support film and the cover film, a laminate composed of the flat film and the support film was separated so that the adhesive layer remained unseparated on the cover film.

The above-described methods were able to manufacture a laminate composed of a flat film being a thin resin film and a support film being a porous body, without causing breakage or cockles in the flat film.

The pressure resistance and the He/N₂ selection ratio were evaluated for the laminates thus obtained. The results of the evaluation are as described in Table 1.

<Methods for Evaluation of Pressure Resistance and He/N₂ Selection Ratio>

At the outset, a laminate sample is mounted on a gas holder in a gas line including a gas holder. A gas cylinder, an area flow meter, a regulator, a pressure sensor, a flow sensor, an exhaust gas line, and a valve at the end of the exhaust gas line were provided on a feed side of the gas holder. A pressure sensor and a precision film flow meter were provided on a permeate side of the gas holder. A N₂ gas was fed from the gas cylinder towards the sample, and the flow rate and the pressure of the feed gas were regulated to 100 ml/min and 200 kPa, respectively, with the area flow meter and the regulator. In this case, when the feed side pressure reached 200 kPa, the pressure resistance of the laminate sample was evaluated as "Good", while, when the feed side pressure did not reach 200 kPa, the pressure resistance of the laminate sample was evaluated as "Bad". Subsequently, the permeate flow rate of the N₂ gas was measured with the precision film flow meter on the permeate side under these conditions. In the same manner as described above, the permeate flow rate of He gas was measured, and the He/N₂ selection ratio α was calculated from the permeate flow rate. When the He/N₂ selection ratio α was 10 or more, the laminate sample was evaluated as "Very Good", while, when the He/N₂ selection ratio α was 2 or more to below 10, the laminate sample was evaluated as "Good", and when the He/N₂ selection ratio α was below 2, the laminate sample was evaluated as "Bad".

Examples 10 to 16 and Comparative Examples 3 to 11

Laminates were prepared in the same manner as in Example 9, except that the material and the thickness for the flat film were changed as described in Table 1 and the material, the opening ratio (area %) of the surface, and the surface roughness for the support film were changed as described in Table 1. For Examples 10 to 12, the pressure resistance and the He/N₂ selection ratio were evaluated in the same manner as in Example 9. The results of evaluation are shown in Tables 1 and 2. When separation between the flat film and the support film occurred during the manufacture of the laminate, the pressure resistance and the He/N₂ selection ratio were not evaluated.

For the material for the flat film, resin 1 was a polyamic acid derived from 3,3',4,4'-biphenyltetracaboxylic dianhydride and 4,4'-diaminodiphenyl ether. Resin 2 was a polyamic acid derived from 3,3',4,4'-biphenyltetracaboxylic dianhydride and 4,4'-diaminodiphenyl ether. Resin 3 was a hydrogenation product of a hydroxyl-terminated styrene-isoprene-butadiene-styrene block copolymer. Resin 4 was a hydrogenation product of a styrene-isoprene-styrene block copolymer. Resin 5 was an ethylene-tetracyclododecene copolymer. When the resins 3 to 5 are used, decahydronaphthalene (decalin) was used as the solvent in the preparation of the resin solution for flat film formation. Resin 6 was polystyrene. When the resin 6 was used, propylene glycol 1-monomethyl ether 2-acetate (PGMEA) was used as the solvent in the preparation of the resin solution for flat film formation.

For the material for the support film, PI, PC, PES, and PTFE were a polyimide resin that are the same as described in the resin 2, polycarbonate, polyethersulfone, and polytetrafluoroethylene, respectively.

In relation to the support film, the PI porous film was a porous film including continuous pores composed of spherical pores. The PC porous film was a porous film including a multitude of through-holes penetrating the film in the thickness direction.

TABLE 1

| | Flat film | | Support film | | Evaluation | |
| | | | | | | |
| | Type of material | Thickness (nm) | Type of material | Opening ratio of the surface (%) | Surface roughness Ra (nm) | Operability of manufacturing a laminate | Pressure resistance (200 kPa) |
|---|---|---|---|---|---|---|---|
| Ex. 9 | Resin 1 | 100 | PI | 20.3 | 86 | Good | Good |
| Ex. 10 | Resin 1 | 800 | PC | 20.3 | 86 | Good | Good |
| Ex. 11 | Resin 1 | 100 | PI | 26.5 | 24 | Good | Good |
| Ex. 12 | Resin 2 | 100 | PI | 20.3 | 86 | Good | Good |
| Ex. 13 | Resin 3 | 100 | PI | 20.3 | 86 | Good | Good |
| Ex. 14 | Resin 4 | 100 | PI | 20.3 | 86 | Good | Good |
| Ex. 15 | Resin 5 | 100 | PI | 20.3 | 86 | Good | Good |
| Ex. 16 | Resin 6 | 100 | PI | 20.3 | 86 | Good | Good |
| Comp. Ex. 3 | Resin 1 | 10000 | PI | 20.3 | 86 | Delamination | — |

TABLE 1-continued

| | Flat film | | Support film | | | Evaluation | |
|---|---|---|---|---|---|---|---|
| | Type of material | Thickness (nm) | Type of material | Opening ratio of the surface (%) | Surface roughness Ra (nm) | Operability of manufacturing a laminate | Pressure resistance (200 kPa) |
| Comp. Ex. 4 | Resin 2 | 10000 | PI | 20.3 | 86 | Delamination | – |
| Comp. Ex. 5 | Resin 1 | 100 | PES | 46.4 | 147 | Delamination | – |
| Comp. Ex. 6 | Resin 1 | 800 | PES | 46.4 | 147 | Delamination | – |
| Comp. Ex. 7 | Resin 1 | 100 | PES | 36.6 | 239 | Delamination | – |
| Comp. Ex. 8 | Resin 1 | 800 | PES | 36.6 | 239 | Delamination | – |
| Coup. Ex. 9 | Resin 1 | 100 | PC | 12.9 | 17 | Good | Good |
| Comp. Ex. 10 | Resin 1 | 100 | PTFE | 45.1 | 1451 | Delamination | – |
| Comp. Ex. 11 | Resin 1 | 800 | PTFE | 45.1 | 1451 | Delamination | – |

TABLE 2

| | Flat film | | Support film | | |
|---|---|---|---|---|---|
| | Type of material | Thickness (nm) | Type of material | Opening ratio of the surface (%) | Evaluation He/N$_2$ selecting ratio α |
| Ex. 9 | Resin 1 | 100 | PI | 216 | Very Good |
| Ex. 10 | Resin 1 | 800 | PC | 216 | Very Good |
| Ex. 11 | Resin 1 | 100 | PI | 441 | Good |
| Ex. 12 | Resin 2 | 100 | PI | 216 | Good |
| Comp. Ex. 9 | Resin 1 | 100 | PC | 6050 | Bad |

In view of Examples 9 to 16 and Comparative Examples 3 to 11, it is understood that a laminate with excellent pressure resistance and He/N$_2$ selection ratio can be manufactured without causing inter-film separation, in which the laminate is composed of the flat film and the support film; the flat film has a thickness of 1000 nm or less, and does not have through-pores with an opening diameter of 1 nm or more; an average diameter of the plurality of openings in the main surface of the support film is below 1000 nm; and an opening ratio of the main surface of the support film is 40 area % or less.

EXPLANATION OF REFERENCE NUMERALS

10 Substrate
11 Coating film
12 Flat film
13 Peeling liquid
14 Support film
15 Cover film
16 Cover film-attached laminate
17 Laminate

What is claimed is:

1. A laminate comprising a flat film and a support film, wherein:
   the flat film has a thickness of 1000 nm or less, and does not have through-pores with an opening diameter of 1 nm or more;
   the support film is a porous film having a surface roughness of 100 nm or less;
   a plurality of openings in the main surface of the support film have an average diameter below 1000 nm; and
   the main surface of the support film has an opening ratio of 40 area % or less.

2. The laminate according to claim 1, wherein the support film has continuous pores that are spherical or substantially spherical and are in communication with each other.

3. The laminate according to claim 2, wherein the pores have an average diameter below 1000 nm.

4. The laminate according to claim 1, wherein a rate of dissolution of the flat film in water and a rate of dissolution of the support film in water are each 1 nm/sec or less.

5. The laminate according to claim 1, wherein the support film has an air permeability of 10 to 300 sec/100 cc.

6. The laminate according to claim 1, wherein the flat film has a tensile strength of 1 to 5 GPa.

7. The laminate according to claim 1, wherein the support film further comprises one or more resins selected from the group consisting of polyimides, polyamide-imides, polyether sulfones and polyvinylidene fluorides.

8. A gas filter comprising the laminate according to claim 1 as a separation membrane.

9. A separation method using the filter according to claim 8, the method comprising:
   separating a gas from a mixture including a solid and the gas;
   separating a gas from a mixture including a liquid and the gas; or
   separating at least one gas from a mixed gas including two or more gases.

* * * * *